United States Patent
Ollier et al.

(10) Patent No.: US 10,422,522 B2
(45) Date of Patent: Sep. 24, 2019

(54) COMBUSTION MODULE HAVING IMPROVED OPERATIONAL SAFETY AND OPTIMIZED THERMAL EFFICIENCY

(71) Applicant: Commissariat a l'energie atomique et aux energies alternatives, Paris (FR)

(72) Inventors: Emmanuel Ollier, Grenoble (FR); Ioannis Mantzaras, Zurich (CH)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 561 days.

(21) Appl. No.: 15/000,904

(22) Filed: Jan. 19, 2016

(65) Prior Publication Data

US 2016/0209080 A1    Jul. 21, 2016

(30) Foreign Application Priority Data

Jan. 20, 2015  (FR) ...................... 15 50449

(51) Int. Cl.
  *F23C 3/00*  (2006.01)
  *F24S 20/40*  (2018.01)
  *F24S 20/20*  (2018.01)

(52) U.S. Cl.
  CPC .............. *F23C 3/002* (2013.01); *F24S 20/20* (2018.05); *F24S 20/40* (2018.05); *F23C 2900/03009* (2013.01); *Y02E 10/41* (2013.01)

(58) Field of Classification Search
  None
  See application file for complete search history.

(56) References Cited

U.S. PATENT DOCUMENTS

| | | | | |
|---|---|---|---|---|
| 3,580,225 | A | * | 5/1971 | Coy .......................... F22D 1/24 122/20 A |
| 5,888,060 | A | * | 3/1999 | Velke ........................ F23K 5/20 110/238 |
| 6,193,501 | B1 | | 2/2001 | Masel et al. |
| 7,862,231 | B2 | | 1/2011 | Liu |

(Continued)

FOREIGN PATENT DOCUMENTS

| | | |
|---|---|---|
| WO | WO 2012/136800 A1 | 10/2012 |
| WO | WO 2014/048992 A1 | 4/2014 |

OTHER PUBLICATIONS

U.S. Appl. No. 14/009,959, filed Feb. 14, 2014, 2014/0166085 A1, Emmanuel Ollier.

(Continued)

*Primary Examiner* — Jason Lau
(74) *Attorney, Agent, or Firm* — Oblon, McClelland, Maier & Neustadt, L.L.P.

(57) ABSTRACT

A combustion module including a body including a combustion chamber, and at least one connector for supplying the combustion chamber with at least one combustible intended to be burned in the combustion chamber, is provided. The supply connector includes at least one inlet orifice intended to be connected to at least one source of combustible through a conduit and at least one outlet orifice intended to be connected to the at least one combustion chamber. The supply connector has a thermal conductivity substantially lower than that of the body such that the supply connector assures that the temperature at the inlet orifice of the supply connector and the conduit is lower than the auto-ignition temperature of the combustible(s).

22 Claims, 6 Drawing Sheets

(56) References Cited

U.S. PATENT DOCUMENTS

| | | | |
|---|---|---|---|
| 2005/0155639 A1* | 7/2005 | Perlo | F23C 99/006 136/205 |
| 2007/0082310 A1* | 4/2007 | Norton | F23C 13/02 431/354 |

OTHER PUBLICATIONS

U.S. Appl. No. 14/128,266, filed Feb. 25, 2014, 2014/0158334 A1, Olivier Dellea et al.
U.S. Appl. No. 14/182,659, filed Feb. 18, 2014, 2015/0274516 A1, Eric Ollier.
U.S. Appl. No. 14/378,267, filed Aug. 12, 2014, 2015/0001990 A1, Emmanuel Ollier et al.
U.S. Appl. No. 14/336,351, filed Jul. 21, 2014, 2015/0021720 A1, Eric Ollier et al.
U.S. Appl. No. 14/514,703, filed Oct. 15, 2014, 2015/00329986 A1, Eric Ollier et al.
U.S. Appl. No. 14/430,762, filed Mar. 24, 2015, 2015/0243871 A1, Eric Ollier.
French Preliminary Search Report dated Oct. 13, 2015 in French Application 15 50449 filed on Jan. 20, 2015 (with English Translation of Categories of Cited Documents).

\* cited by examiner

COMBUSTION MODULE HAVING IMPROVED OPERATIONAL SAFETY AND OPTIMIZED THERMAL EFFICIENCY

TECHNICAL FIELD AND PRIOR ART

The present invention relates to a combustion module having improved operational safety and a hybrid solar system comprising at least one such combustion module.

Electricity production devices exist comprising a combustion module and a thermoelectric module, the hot face of the thermoelectric module being in contact with one of the faces of the combustion module. By burning one or more gases in the combustion module, the face of the thermoelectric module in contact with the combustion module is heated, a temperature gradient appears in the thermoelectric module, there is then production of electricity.

An example of such a device is described in the document U.S. Pat. No. 7,862,331.

The combustion module comprises a chamber supplied with gas via at least one supply pipe, the combustion gases are evacuated via at least one evacuation conduit.

The material of the module has very good thermal conductivity since it is wished to use the heat produced in the module outside of the module. In this type of module, the temperature is of the order of 600° C. The supply and evacuation pipes are then for example made of steel.

It is on the one hand desirable to reduce thermal losses from the combustion chamber to the exterior outside of the surface in contact with the thermoelectric module. Yet the supply and evacuation pipes, which are generally made of metal, more particularly made of steel, may be the source of thermal losses.

Furthermore, in the case where it is wished to reach in the combustion module a temperature greater than 700° C., or even 800° C. or more, there exist risks of auto-ignition of the gas in the supply pipe; since the supply pipe is also heated to very high temperature. The operational safety of this combustion module may be improved.

The document WO2014/048992 describes a hybrid solar device for producing electricity comprising a first face subjected to solar radiation, a second face in contact with a thermoelectric generator and for example a combustion chamber between the first face and the second face, this combustion chamber forms an additional heat source capable of compensating variations in the solar flux. In this type of device it is wished to be able to reach a temperature of the order of 800° C.

DESCRIPTION OF THE INVENTION

It is consequently an aim of the present invention to offer a combustion module comprising a combustion chamber of at least one gas offering improved operational safety and capable of reaching temperatures higher than modules of the prior art.

The aforementioned aim is attained by a combustion module comprising at least one combustion chamber, at least one inlet for supplying with gas said chamber, at least one evacuation outlet of said chamber, and at least one connector made of heat insulating material arranged at the supply inlet, the pipe(s) for supplying with at least one gas being connected to the combustion chamber via the heat insulating connector.

The temperature at least at a distal end of the heat insulating connector is substantially reduced compared to that of the combustion chamber, thus the gas supply pipe(s) are not heated to temperatures capable of causing risks of auto-ignition of the combustion gas, risks of auto-ignition are thus avoided or at the very least notably reduced. Furthermore, heat leakages via the supply pipe are reduced, which improves the efficiency of the module.

Advantageously, the combustion module also comprises a heat insulating connector at the evacuation outlet which makes it possible to further reduce heat leakages.

Preferably, the supply connector also assures a function of distribution and/or mixing of the gas or gases in the chamber. It comprises for example one inlet and several outlet orifices. This embodiment also has the advantage of simplifying the connection between the combustion module and the pipe(s) for supplying the exterior environment with gas. In a similar manner the evacuation connector comprises for example several inlet orifices and an outlet orifice.

Advantageously the distribution is uniform in the different combustion chambers, i.e. the flows entering each chamber are substantially equal.

The supply connector and/or the evacuation connector are for example made of zirconium oxide, mullite, alumina and the combustion chamber(s) are for example made of silicon carbide SiC.

The subject matter of the present invention is then a combustion module comprising a body including a combustion chamber, at least one connector for supplying the combustion chamber with combustion gas or gases intended to be burned in the combustion chamber, said supply connector comprising at least one inlet orifice intended to be connected to at least one source of gas through a conduit and at least one outlet orifice intended to be connected to the at least one combustion chamber and the supply connector having a thermal conductivity substantially lower than that of the body such that the supply connector assures that the temperature at the inlet orifice of the supply connector and the conduit is lower than the auto-ignition temperature of the combustible(s).

The module advantageously comprises an evacuation connector having a thermal conductivity substantially lower than that of the body.

The material of the supply connector advantageously has a thermal conductivity less than 50 W/m·K, preferentially less than 10 W/m·K. Advantageously, the material of the evacuation connector also has a thermal conductivity less than 50 W/m·K, preferentially less than 10 W/m·K.

In an example of embodiment, the body comprises several combustion chambers and the supply connector then comprises an inlet orifice and as many outlet orifices as combustion chambers and a network for distributing combustible between the inlet orifice and the outlet orifices.

In another example of embodiment, the body comprises several combustion chambers and the supply connector comprises at least two inlet orifices and as many outlet orifices as combustion chambers, a network for distributing combustible between the inlet orifices and the outlet orifices, and a mixing zone situated downstream of the two inlet orifices and upstream or downstream of the distribution network. The distribution network and/or the mixing zone may advantageously comprise a porous structure.

Preferably, the porous structure is made of heat insulating material.

In another example of embodiment, the body comprises several combustion chambers and the evacuation connector comprises means for collecting combustion gases at the outlet of the combustion chambers and an outlet orifice.

According to an additional characteristic, the supply connector may comprise means to be inserted in the body at the connection between the at least one combustion chamber and an outlet orifice of the supply connector.

The body may have substantially the shape of a rectangular parallelepiped including two faces of larger surfaces, connected by two lateral faces and two end faces, the at least one combustion chamber emerging in the end faces.

The body is for example made of SiC and the supply connector and the evacuation connector are for example made of zirconium oxide.

The subject matter of the present invention is also a combustion device comprising at least one combustion module according to the invention, at least one gas source and one conduit connected to the inlet orifice of the supply connector and to the gas source.

Preferably, the combustion device comprises a source of combustible and a source of oxidizer, for example a source of $H_2$ and a source of oxygen respectively. The supply connector may comprise either two inlet orifices each connected to a source, or a single inlet orifice connected to a mixing device connected to the two sources.

The subject matter of the present invention is also a hybrid solar system comprising means for concentrating solar radiation, at least one combustion module according to the invention or one combustion device according to the invention, the module or the device being arranged such that concentrated radiation illuminates one face of the body and means for converting thermal energy into electricity on one face opposite to that illuminated by the concentrated solar radiation, and means for controlling combustion in the combustion module as a function of the concentrated solar radiation.

The means for concentrating solar radiation may comprise at least one mirror or Fresnel lens.

BRIEF DESCRIPTION OF THE DRAWINGS

The present invention will be better understood with the help of the description that follows and the appended drawings, in which.

DETAILED DESCRIPTION OF PARTICULAR EMBODIMENTS

In the description that follows, upstream is to be considered on the supply side and downstream is to be considered on the evacuation side. Furthermore, for reasons of simplicity, air will be designated as a gas and not as a mixture of gases.

Figure 1:
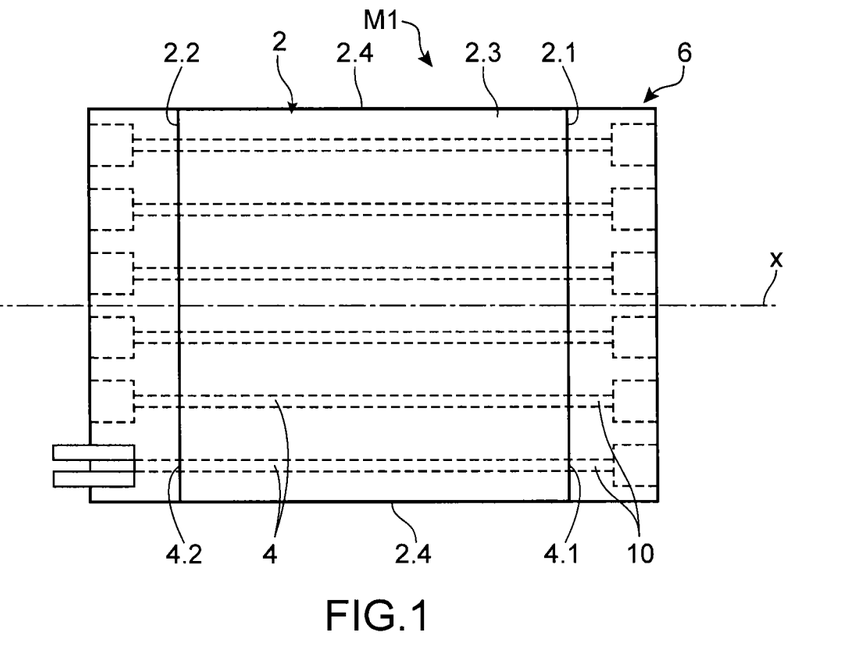
FIG. 1 is a schematically represented top view of an example of embodiment of the combustion module.

In FIG. 1 may be seen an example of combustion module M1 comprising a body 2 including a plurality of combustion chambers 4, a supply connector 6 and an evacuation connector 8.

The body 2 extends along a longitudinal direction X and has a first longitudinal face 2.1 or first end face 2.1 and a second longitudinal face 2.2 or second end face 2.2. In the example represented, the body has the shape of a rectangular parallelepiped. It further comprises upper and lower faces 2.3 (not visible) which have a larger surface and two lateral faces 2.4.

The combustion chambers 4 extend parallel to a direction X.

Preferably, the combustion chambers 4 are spread out in a variable manner in the body along a transversal direction, advantageously they are more close together at the lateral faces in order to compensate thermal losses.

Figure 12:
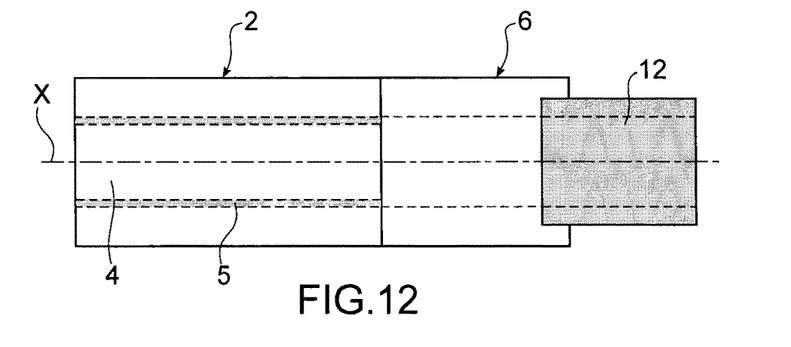
FIG. 12 is a side view of an example of combustion module, in which each combustion chamber has a deposition of combustion catalyst.

In the example represented, each chamber 4 is in the form of a channel of which a first end 4.1 emerges in the first face 2.1 and of which a second end 4.2 emerges in the second face 2.2. Advantageously, each chamber 4 advantageously comprises at its surface a layer 5 of material of a certain thickness covering the inner surface of the combustion chambers, this material having a catalytic activity to initiate and maintain combustion of the gases (FIG. 12).

In a variant, combustion may also be initiated by input of external energy such as for example a spark, a heating resistance. In the case of a module used in a hybrid manner which associates both solar energy and energy stemming from combustion, the energy may be simply that input by the concentration of solar radiation on the body.

A combustion module comprising a single combustion chamber and/or chambers having other shapes does not go beyond the scope of the present invention.

The first end of the chamber 4 is intended for the supply with gas (combustible and oxidizer) with a view to combustion and the second end 4.2 is intended for the evacuation of combustion gases and potential unburned gases.

In the example represented, the supply connector 6 comprises as many through borings 10 as combustion chambers 4, each of the borings 10 being intended to be aligned with a supply end 4.1 of a combustion chamber 4.

The supply connector 6 comprises a first end face 6.1 intended to be connected to one or more sources of gas via the supply tubes 12 and a second end face 6.2 in contact with the longitudinal face 2.1 of the body. The borings 10 emerge in the first end face 6.1 and in the second end face 6.2.

The supply connector 6 is made of a heat insulating material such that it limits the transfer of heat from the connection module to the exterior in the direction X. The material of the supply connector 6 has a thermal conductivity substantially less than that of the material of the body 2.

The heat insulation procured by the supply connector is such that the temperature on its end face 6.1 is sufficiently reduced compared to that on its face 6.2 in contact with the body to avoid auto-ignition of the combustible gas or gases in the supply pipe(s) 12.

In the present application "heat insulating material" is taken to mean a material of thermal conductivity less than 50 W/m·K, preferably less than 10 W/m·K. The thermal conductivity is preferably at least 5 times less than that of the body. This material may be for example zirconium oxide, mullite, cordierite or alumina.

The body for its part is for example made of a good heat conducting material, that is to say having a thermal conductivity greater than 30 W/m·K at room temperature, preferably greater than 100 W/m·K. It may be for example silicon carbide, steel, Inconel® or other alloys.

Figure 2A:
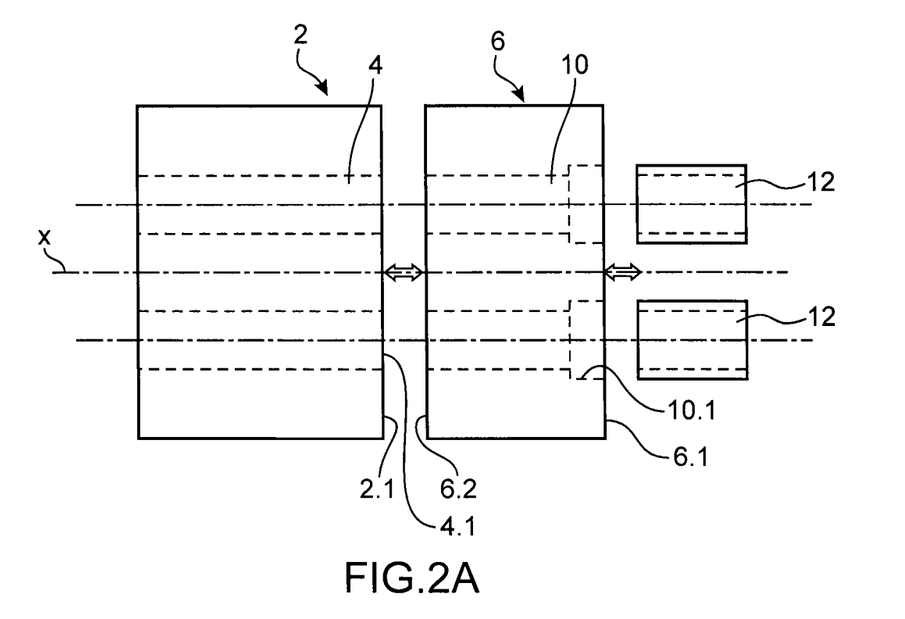
FIGS. 2A and 2B are schematically represented top views of examples of connection between the elements of the combustion module.

In FIG. 2A may be seen a detailed view of the module of FIG. 1 at the connection between the supply connector 6 and the body 2 on the one hand and between the supply connector 6 and the gas supply tubes 12 on the other hand. The supply tubes 12 are connected to one or more gas sources. For example, the gases intended to be burned in the combustion chamber are for example $H_2$ or a mixture of $H_2$ and methane or methanol with $O_2$ or air.

In the example represented, the second end face 6.2 and the longitudinal face 2.1 are in planar abutment and integral with each other so as to assure a leak tight connection between the borings 10 and the combustion chambers 4.

Moreover in the example given, the ends of the borings 10 emerging in the first end face 2.1 comprise a portion of larger diameter 10.1 making it possible to accommodate the ends of supply tubes 12.

The tubes 12 may for example be made of metal or metal alloys, for example made of steel. Yet, on account of the presence of the heat insulating connector interposed between the body and the supply tubes, their temperature is reduced compared to that of the combustion chamber 4 and the risks of auto-ignition are substantially reduced. The heat insulation procured by the supply connector is due to the heat insulating material and to the dimensions of the supply connector, notably in the direction X.

Figure 2B:
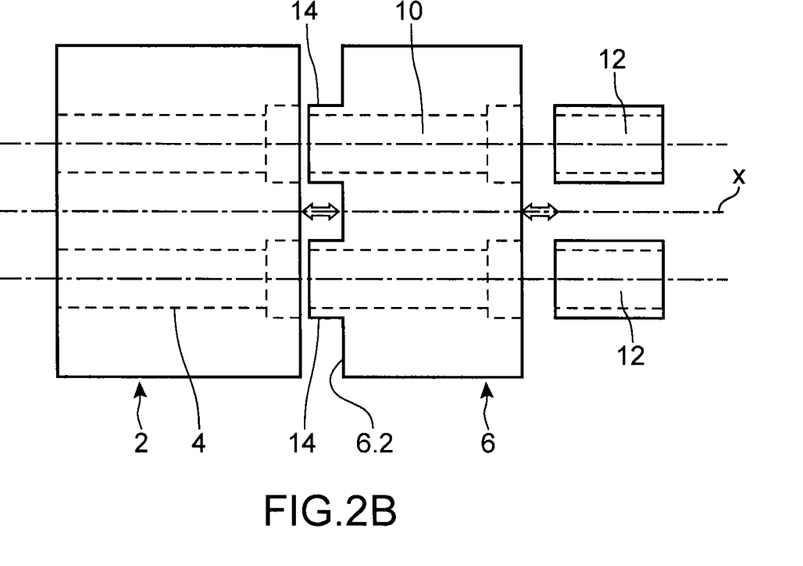

In FIG. 2B may be seen a variant of embodiment of the supply connector 6 in which the second end face 6.2 comprises annular projections 14. Each annular projection 14 runs alongside an emerging end of the borings 10 in the end face 2.2. The annular projections 14 penetrate into one end of the chambers emerging in the end face 2.1 by insertion. The end of the combustion chamber has a sufficient diameter to receive this annular projection 14. Thanks to this variant, the connection leak tightness between the connector and the body is improved as well as its sturdiness, its production is simplified and alignment between the borings 10 and the chambers 4 is simplified.

In the example represented and very advantageously, the combustion module also comprises an evacuation connector 8 which is preferably made of heat insulating material. In the example represented the structure of the evacuation connector 8 is substantially that of the supply connector 6. It may also have the structure of the supply connector of FIG. 2B. But it will be understood that this is not limiting and that it may have a different structure.

It may for example not be made of heat insulating material since there is no or very little risk of auto-ignition. Nevertheless, if it offers heat insulation it makes it possible to reduce thermal losses and thus to improve heat recovery. Moreover, since the temperature at the outlet of the evacuation connector is substantially lower than that in the body, it makes it possible to use evacuation tubes made of steel or more generally made of material offering lower temperature resistance.

This combustion module may be advantageously implemented to produce a hybrid solar system in which the upper face is subjected to solar radiation and the lower face is in contact with thermoelectric modules, the heat produced by the combustion chamber making it possible to compensate variations in sunlight and to have a substantially continuous and constant operation of the thermoelectric modules. An example of such a system will be described in detail below.

In a variant, the lower face may also comprise an optical surface emitting infrared radiation in the direction of a thermophotovoltaic cell capable of converting the infrared radiation emitted into electrical power.

Preferably, at least for application to a solar system, several combustion chambers are spread out in a single plane parallel to the lower and upper faces to assure conduction of heat from the upper face to the lower face.

Figure 10:
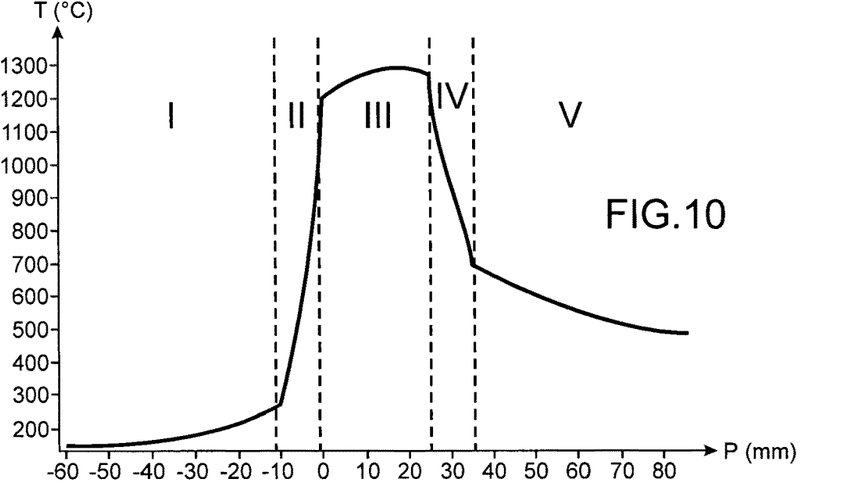
FIG. 10 is a graphic representation of the variation in temperature along a longitudinal direction extending between the supply connector and the evacuation connector.

In FIG. 10 may be seen the variation in T temperature in ° C. of the combustion module of FIG. 1 as a function of the position P in mm along the x-axis situated on the inside of a combustion channel in the body 2 and in the zones for supplying and evacuating the gases of the corresponding channel. An air and $H_2$ mixture is burned in the combustion chambers.

The two connectors are made of zirconium oxide and have a dimension in the direction X of 10 mm and the body is made of SiC and has a dimension in the direction X of 25 mm, a dimension in a direction transversal to the direction X of 25 mm and a distance between the upper face and the lower face of 5 mm.

Zone I corresponds to the supply tubes 12, zone II corresponds to the supply connector 6, zone III corresponds to the body 2, zone IV corresponds to the evacuation connector 8 and zone V corresponds to the evacuation pipes.

The temperature in the body reaches 1300° C. whereas the temperature in the supply tubes is lower than 300° C. avoiding any risk of auto-ignition which generally only arises at a temperature greater than 600° C. in stoichiometric conditions. This temperature difference is obtained thanks to the heat insulating supply connector 6. In fact it may be noted that this imposes a considerable temperature gradient between the face 6.1 of the supply connector 6 on which are connected the supply tubes 12 and the face 6.2 of the supply connector in contact with the body 2.

The temperature at the outlet of the evacuation connector 8 is of the order of 700° C. The temperature gradient in the evacuation connector is below that in the supply connector 6 because the outflowing gases are hot. Nevertheless, this higher temperature at the outlet of the evacuation connector is not bothersome since there is no risk of auto-ignition. In addition the temperature of 700° C. is sufficiently low to enable steel tubes to be used. The evacuation connector reduces thermal losses at the face 2.2 of the body.

The material of the supply connector and its dimensions are chosen as a function of the desired temperature difference between the supply tubes and the body.

The temperatures above which a risk of auto-ignition exist differ according to the gases intended to be burned in the combustion chamber(s), for example the temperature at atmospheric pressure is 535° C. for $CH_4$, 450° C. for $C_3H_8$, 287° C. for $C_4H_{10}$.

Preferably, this temperature difference is comprised between 100° C. and 1000° C. Preferably the material of the supply connector preferably has a thermal conductivity less than 50 W/m·K, and preferably a thermal conductivity less than 30 W/m·K. The heat insulating material may be for example zirconium oxide, mullite or alumina. The body is made of heat conducting material and resistant to high temperatures such as silicon carbide SiC, a refractory steel or instead an Inconel.

Preferably the lateral faces of the body are thermally insulated to further limit thermal losses.

Figure 3:
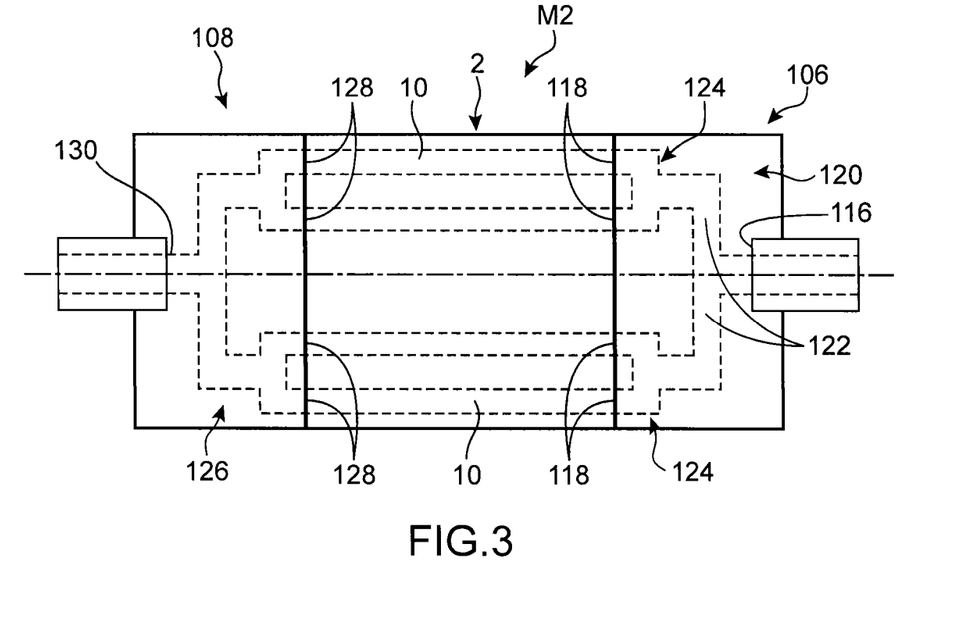
FIG. 3 is a schematically represented top view of another example of embodiment of the combustion module in which the supply connector forms a distributor.

In FIG. 3 may be seen an example of embodiment of a combustion module M2 in which the supply connector also assures a distribution function.

In this example the body 2 comprises four combustion chambers 10.

The supply connector 106 comprises a single inlet orifice 116 connected to the gas source(s) and the four outlet orifices 118 aligned with the four combustion chambers. The supply connector 106 is made of heat insulating material.

In this example, the gases are mixed before being sent into the supply connector which makes it possible to only have one inlet orifice.

The supply connector then comprises within it a distribution network 120 which makes it possible to distribute the gas or mixtures of gas in the four combustion chambers.

In the example represented, the network of channels comprises two channels 122 connected to the inlet orifice and two pairs of sub-channels 124, each sub-channel 124 is connected by one end to a channel 122 and by another end to an outlet orifice 118. The gas stream is then divided into two, then again divided into two in order to supply the four combustion chambers uniformly.

The implementation of such a supply connector makes it possible, apart from the reduction in temperature at the gas supply tube, to reduce the cost of the module since a single tube connects the gas source(s) to the supply connector, to simplify manufacture and to reduce thermal losses since heat leakages only occur along a single tube.

Moreover, the gases are further mixed together by circulating in the supply connector.

In the example represented, the evacuation connector 108 has a shape symmetrical to that of the supply connector. It comprises a network of channels 126 including four inlets 128 connected to the four outlets of the combustion chambers and an outlet 130. The network of channels 126 does not have a distribution function but a function of collecting and grouping together the gases flowing out of the combustion chambers to a single outlet.

As for the supply connector, this structure of evacuation connector makes it possible to produce combustion modules having reduced cost price and simplified manufacture. Moreover, heat leakages are reduced. Furthermore, the fact of having identical supply and evacuation connectors makes it possible to have only a single connector reference for manufacture, which reduces the costs of manufacturing, storage, management and simplifies manufacture.

Figure 4:
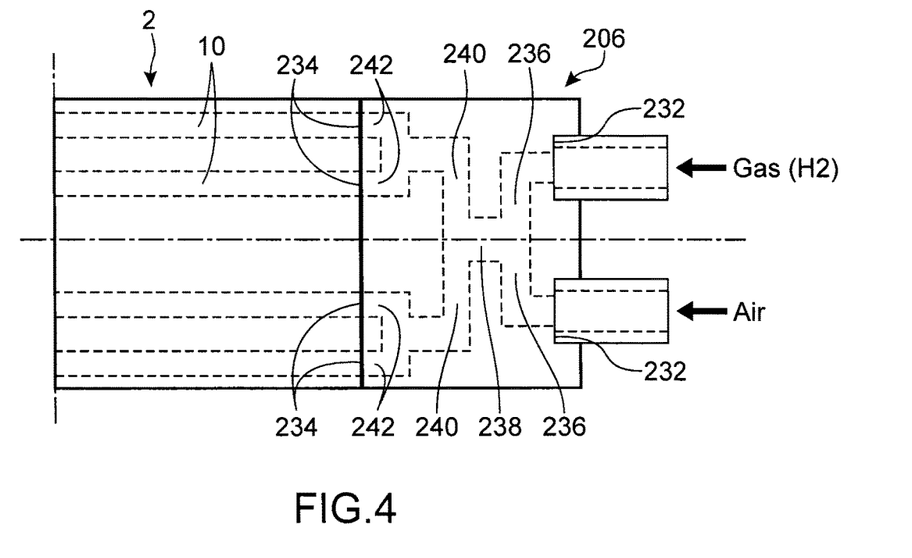
FIG. 4 is a schematically represented top view of an example of embodiment of the combustion module in which the supply connector forms a distributor and a mixer.

In FIG. 4 may be seen another example of embodiment of a combustion module M3 in which only the body 2 and the supply connector 206 are represented. The body 2 comprises four combustion chambers 10.

The supply connector comprises two inlet orifices 232, four outlet orifices 234 connected to the combustion chambers and a network of channels and sub-channels to connect the two inlet orifices 232 to the four outlet orifices 234.

The network comprises two first channels 236 each connected to an inlet orifice 232, a mixing chamber 238 in which the two channels 236 emerge, two second channels 240 going from the mixing chamber 238 which each divide into a pair of sub-channels 242 emerging in two outlet orifices 234.

Advantageously, each inlet orifice is connected to a different gas source, for example one is connected to a source of oxygen or air and the other to a source of $H_2$. The two gases are mixed in the mixing chamber 238 before being distributed to the four combustion chambers. This connector avoids having to carry out a premixing of the gases, which could turn out to be dangerous.

Very advantageously, the mixing chamber may comprise means for favoring mixing, for example it may be filled in all or part by a porous structure, for example a stack of beads or a porous material. The structure may be macroporous or then microporous.

The evacuation connector which is not represented may have a symmetrical structure with respect to that of the supply connector, nevertheless the implementation of two outlet orifices and a mixing chamber does not bring any advantage on the evacuation side. Preferably the evacuation connector may have a structure similar to or identical to that of the connector of FIG. 3.

Figure 5:
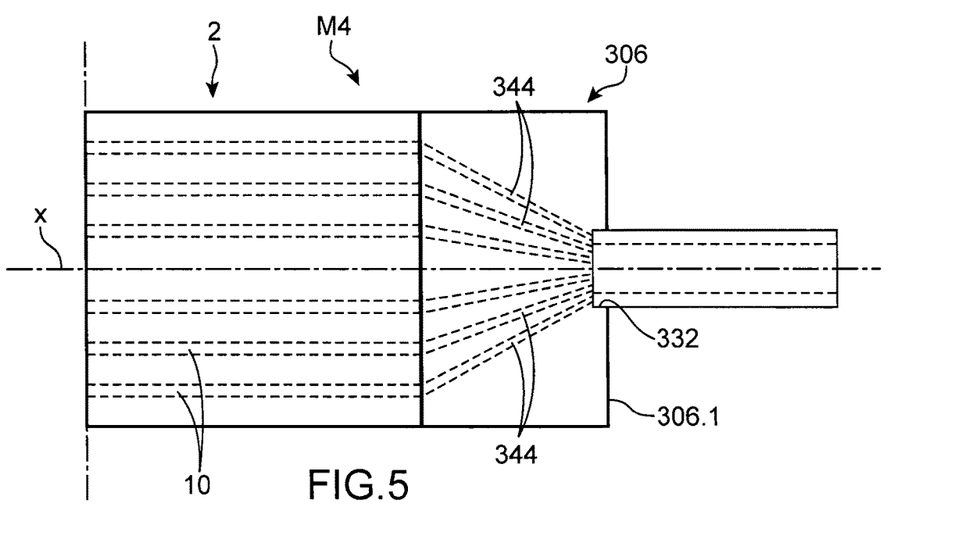
FIG. 5 is a schematically represented top view of a combustion module with a single inlet.

In FIG. 5 may be seen another example of embodiment of a combustion module M5 for which only the body 2 and the supply connector 306 are represented. The supply connector 306 comprises an inlet orifice 332 in the longitudinal face 306.1 and as many channels 344 as combustion chambers 10, six in the example represented. A supply pipe is connected to the inlet orifice 332, which is itself connected to all the channels 344 and supplies them in parallel. In the example represented, the channels 344 are spread out in a fan shape from the inlet orifice. This example of embodiment has the advantage, compared to the supply connector of FIG. 1, of reducing the number of inlet orifices and thus of reducing heat leakages via the supply tubes, and also of reducing manufacturing costs. The evacuation connector which is not represented may have a symmetrical shape with that of the supply connector or another structure. Moreover, it is recalled that a combustion module without evacuation connector does not go beyond the scope of the present invention.

Figure 6:
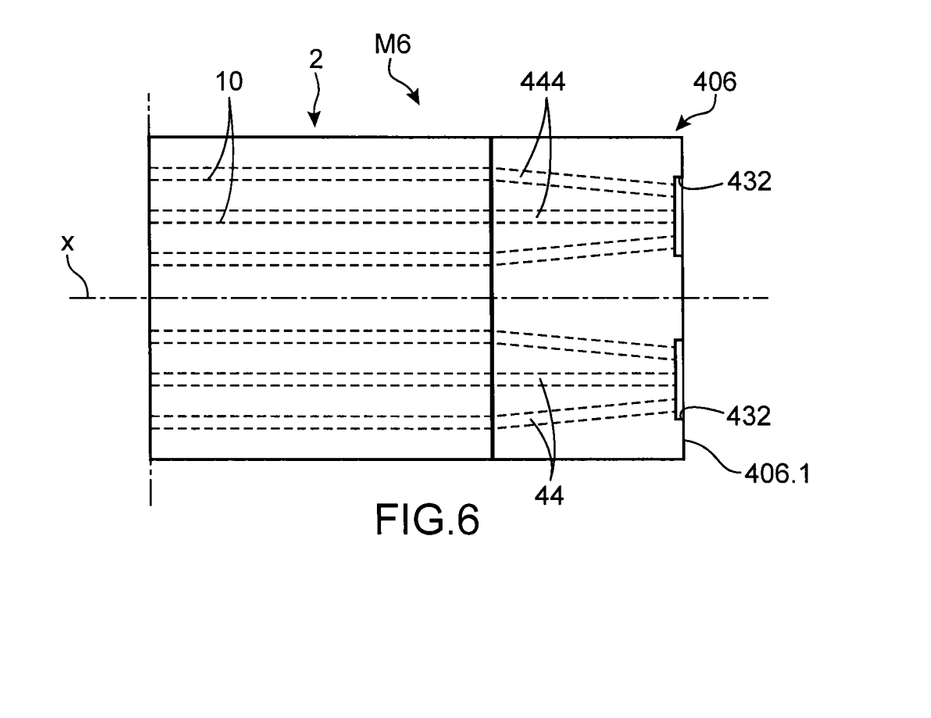
FIG. 6 is a schematically represented top view of a variant of embodiment of the module of FIG. 5 in which the supply connector has two inlets.

In FIG. 6 may be seen a variant of the combustion module M6 of FIG. 5 in which only the body 2 and the supply connector 406 are represented.

The supply connector comprises two inlet orifices 432 in the longitudinal face 406.1 and as many channels 444 as combustion chambers 10, six in the example represented. Each inlet orifice 432 is connected to three channels, these are thus supplied simultaneously by the inlet orifice. In the example represented, the channels are spread out in a fan shape from the inlet orifice. This example of embodiment has the advantage, compared to the supply connector of FIG. 1, of reducing the number of inlet orifices and thus of reducing heat leakages via the supply tubes and also of reducing manufacturing costs.

The evacuation connector which is not represented may have a symmetrical shape to that of the supply connector or another structure. Moreover, it is recalled that a combustion module without evacuation connector does not go beyond the scope of the present invention.

Figure 7:
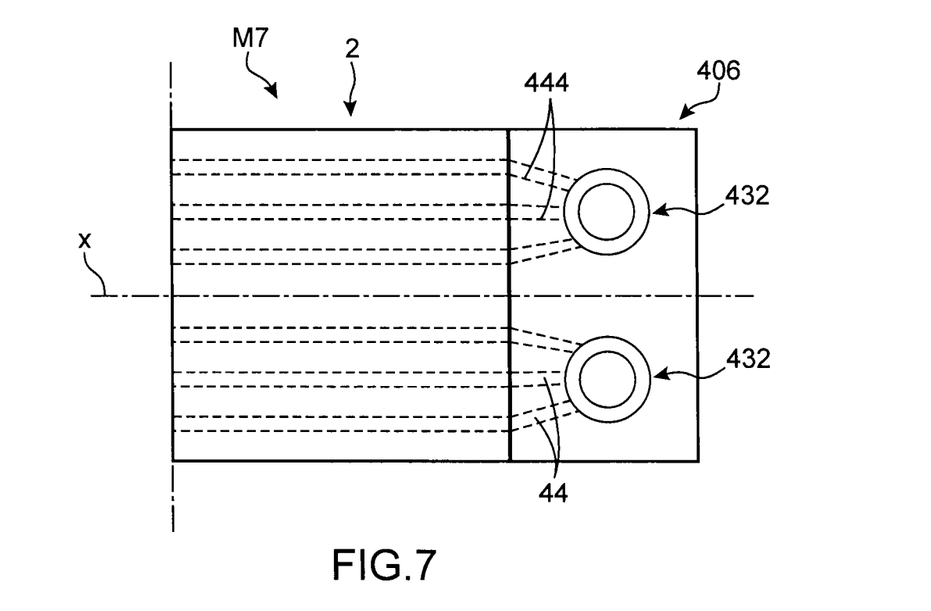
FIG. 7 is a schematically represented top view of a variant of embodiment of another supply connector with two inlets perpendicular to the plane of the combustion module.

In FIG. 7 may be seen a variant of embodiment M7 of the module of FIG. 6 in which the inlet orifices 432 are not in the longitudinal face of the supply connector but in the upper face of the supply connector. In a variant, it could be in the lower face.

Figure 8:
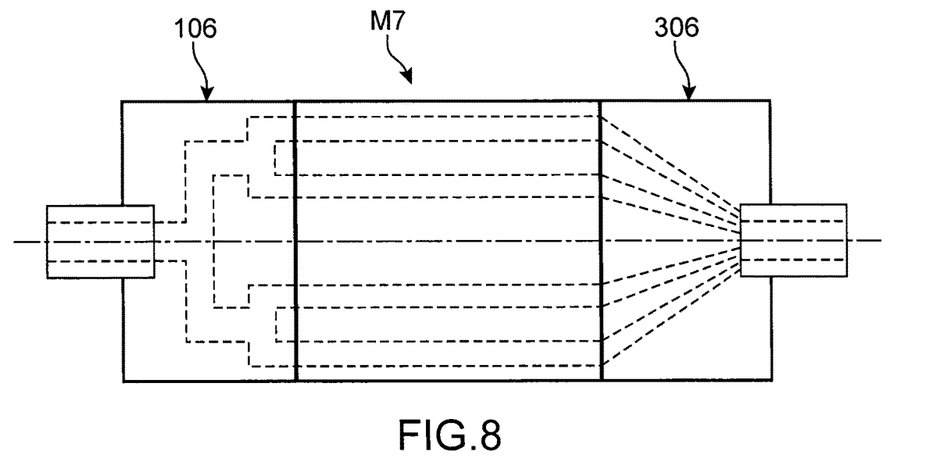
FIG. 8 is a schematically represented top view of another example of embodiment of a combustion module, having a distributor at the inlet and an evacuation with a single outlet.

In FIG. 8 may be seen an example of combustion module M8 comprising a supply connector 106 and an evacuation connector symmetrical to the supply connector 306.

This module has the advantage of only having a single inlet orifice and a single outlet orifice.

Figure 9A:
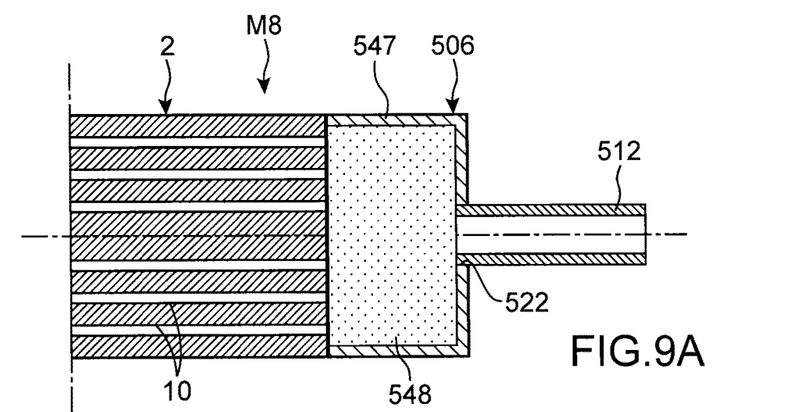
FIG. 9A is a schematically represented longitudinal sectional view seen from above of another example of embodiment of a combustion module.

In FIG. 9A may be seen another example of embodiment of a combustion module M8 in which the supply connector forms a distributor 506. Only the body 2 and the supply connector 506 are represented.

The connector 506 comprises a case 547 provided with a supply inlet 522 on a longitudinal face and connected to a supply pipe 512 and an opposite longitudinal face connected to the combustion chambers 10 and a porous heat insulating structure 548 arranged in the case between the inlet orifice and the outlet face, this porous structure assures the distribution of gas to all the combustion chambers. The porous structure may be microporous or macroporous. The structure may be made of zirconium oxide, mullite or alumina and have pores of sizes going from several hundreds of nanometers to several millimeters. Preferably the pores have a diameter of several millimeters to limit head losses in the flow of the gases.

For example, it may comprise beads advantageously made of heat insulating material. This structure offers the advantage of also assuring mixing of the gases.

Figure 9B:
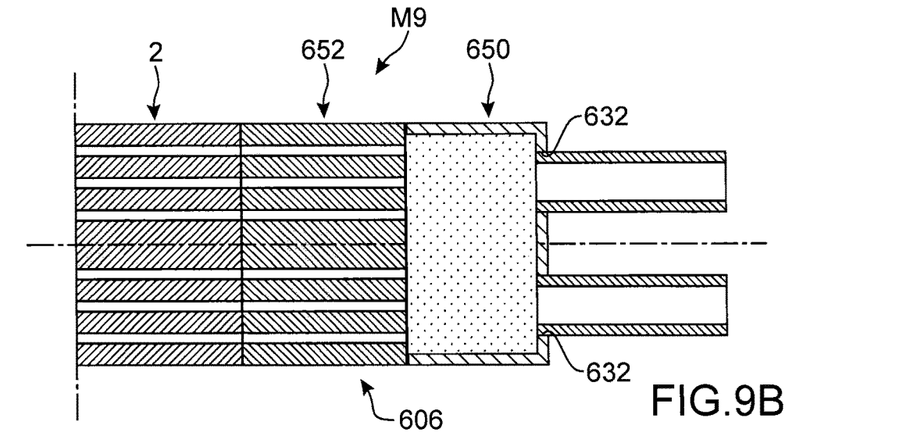
FIG. 9B is a schematically represented longitudinal sectional view seen from above of a variant of the module of FIG. 9A.

In FIG. 9B may be seen a variant of embodiment M9 in which only the body 2 and the supply connector 606 are represented. The supply connector 606 comprises two inlet orifices 632, for example one dedicated to a gas, for example $H_2$ and the other dedicated to another gas, for example oxygen or air. The supply connector also comprises a case, a mixing zone 650 and a distribution zone 652. The mixing zone comprises for example a porous structure and the distribution zone comprises for example as many channels as combustion chambers and which are aligned therewith. The mixing zone is supplied with oxygen and with $H_2$, the two gases mix together and the mixture flows in the channels to the combustion chambers.

In a variant, the distribution zone could be upstream and the mixing zone, which thus assures distribution, downstream.

The distribution zone and/or the mixing zone are made of heat insulating materials.

Concerning the evacuation collector it is possible to provide a single collector connected to all the combustion chambers.

The body may be produced for example by the following methods:
 Cutting and drilling of a solid piece.
 Machining of two half-pieces of which at least one is machined on its surface to form channels, then assembly of the two together.
 Ceramic powder injection techniques.
 Three dimensional printing of the piece with its channels.

Furthermore, the formation of the catalytic surface inside the combustion channels may be carried out by liquid phase impregnation of catalyst, by vapor phase deposition of catalyst, by addition of an element having an inner surface bearing catalytic material.

The connectors may be produced by the same techniques as the body.

The assemblies may be produced for example by brazing, welding or by the use of high temperature technical adhesives.

Figure 11:
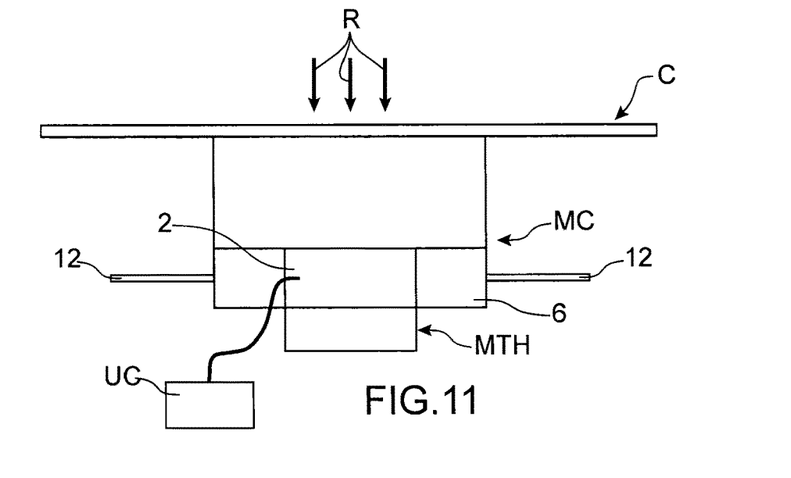
FIG. 11 is a schematic representation of a hybrid solar system implementing the combustion module according to the invention.

In FIG. 11 may be seen a schematic representation of an example of a solar system comprising a combustion module according to the invention. Solar radiation is shown schematically by the arrows R.

The solar system comprises means for concentrating C solar radiation, a combustion module MC arranged opposite the means for concentrating C with respect to the sun such that the upper face of the body is illuminated by concentrated solar radiation and thermoelectric modules MTH of which the hot face is in thermal contact with the lower face of the body of the module.

The system comprises means for controlling UC combustion of the chamber in concentrated solar radiation operation so as to maintain a substantially constant temperature on the lower face of the body of the combustion module.

The means for concentrating radiation are for example a mirror or Fresnel lens.

The thermoelectric modules may for example be replaced by any device capable of converting heat into electricity or another form of energy. For example, thermophotovoltaic cells may be implemented; they are not in physical contact with the hot face but are arranged opposite the hot face of the module.

The operation of the solar system will now be described.

When solar radiation is sufficient it heats the body of the combustion module by striking its upper face after having been concentrated.

Heat is transferred by conduction through the body up to the lower face, a thermal gradient then appears in the thermoelectric modules and electricity is produced. In the case of thermophotovoltaic conversion, the infrared radiation emitted by the hot face is converted into electricity.

If radiation is insufficient, for example in the event of cloudy periods or at night time, gases are burned in the combustion chambers, heat is produced, which completes that produced by solar radiation or offsets its absence. A thermal gradient then appears in the thermoelectric modules and electricity is produced. In the case of thermophotovoltaic conversion, the infrared radiation emitted by the hot face is converted into electricity.

The system also makes it possible at any moment to choose the level of electrical energy produced by adapting the contribution of combustion by varying the gas flows. This thus enables adaptation to meet demand.

The invention claimed is:

1. A combustion module of a given combustible or given combustibles, comprising:
 a body including a combustion chamber; and
 at least one connector for supplying the combustion chamber with gas or gases intended to be burned in the combustion chamber, said supply connector comprising at least one inlet orifice configured to be connected to at least one source of gas through a conduit and at least one outlet orifice configured to be connected to the at least one combustion chamber and the supply connector having a thermal conductivity substantially lower than a thermal conductivity of the body such that the supply connector assures that the temperature at the inlet orifice of the supply connector and the conduit is lower than the auto-ignition temperature of the given combustible or given combustibles,
 in which the body is made of SiC, steel, or Inconel and the supply connector is made of zirconium oxide, mullite, cordierite, or alumina.

2. The combustion module according to claim 1, comprising an evacuation connector having a thermal conductivity substantially lower than that of the body.

3. The combustion module according to claim 1, in which the thermal conductivity of the supply connector is less than 50 W/m·K.

4. The combustion module according to claim 1, in which the body comprises several combustion chambers and the supply connector comprises an inlet orifice and as many outlet orifices as combustion chambers and a network for distributing combustible between the inlet orifice and the outlet orifices.

5. The combustion module according to claim 1, in which the body comprises several combustion chambers and the supply connector comprises at least two inlet orifices and as many outlet orifices as combustion chambers, a network for distributing gas between the inlet orifices and the outlet orifices, and a mixing zone situated downstream of the two inlet orifices and upstream or downstream of the distribution network.

6. The combustion module according to claim 4, in which the distribution network and/or the mixing zone comprises a porous structure.

7. The combustion module according to claim 6, in which the porous structure is made of heat insulating material.

8. The combustion module according to claim 2, in which the body comprises several combustion chambers and the evacuation connector comprises a collector for collecting combustion gases at the outlet of the combustion chambers, and an outlet orifice.

9. The combustion module according claim 1, in which the supply connector comprises a insertion part configured to be inserted in the body at the connection between the at least one combustion chamber and an outlet orifice of the supply connector.

10. The combustion module according claim 2, in which the body has substantially the shape of a rectangular parallelepiped including two faces of larger surfaces, connected by two lateral faces and two end faces, the at least one combustion chamber emerging in the end faces.

11. The combustion module according to claim 10, in which the body is made of SiC and the supply connector and the evacuation connector are made of zirconium oxide.

12. A combustion device comprising at least one combustion module according to claim 1, at least one gas source and one conduit connected to the inlet orifice of the supply connector and to the source of combustible.

13. The combustion device according to claim 12, comprising a source of combustible and a source of oxidizer and in which the supply connector comprises either two inlet orifices each connected to a source, or a single inlet orifice connected to a mixing device connected to the two sources.

14. A hybrid solar system comprising:
a concentrator for concentrating solar radiation;
at least one combustion module of a given combustible or given combustibles, the combustion module comprising:
a body including a combustion chamber, and
at least one connector for supplying the combustion chamber with gas or gases intended to be burned in the combustion chamber, said supply connector comprising at least one inlet orifice configured to be connected to at least one source of gas through a conduit and at least one outlet orifice configured to be connected to the at least one combustion chamber and the supply connector having a thermal conductivity substantially lower than a thermal conductivity of the body such that the supply connector assures that the temperature at the inlet orifice of the supply connector and the conduit is lower than the auto-ignition temperature of the given combustible or given combustibles, the combustion module being arranged such that concentrated radiation illuminates one face of the body and a converter for converting thermal energy into electricity on one face opposite to that illuminated by the concentrated solar radiation; and
a controller for controlling combustion in the combustion module as a function of the concentrated solar radiation.

15. The hybrid solar system according to claim 14, in which the means for concentrating solar radiation comprise at least one mirror or Fresnel lens.

16. The combustion module according to claim 2, in which the thermal conductivity of the evacuation connector is less than 50 W/m·K.

17. The combustion module according to claim 2, in which the thermal conductivity of the supply connector and the thermal conductivity of the evacuation connector are less than 10 W/m·K.

18. The combustion device according claim 12, comprising a source of $H_2$ and a source of oxygen, and in which the supply connector comprises either two inlet orifices each connected to a source, or a single inlet orifice connected to a mixing device connected to the two sources.

19. A hybrid solar system comprising:
a concentrator for concentrating solar radiation;
at least one combustion device comprising:
at least one combustion module, the combustion module comprising:
a body including a combustion chamber,
at least one connector for supplying the combustion chamber with gas or gases intended to be burned in the combustion chamber, said supply connector comprising at least one inlet orifice configured to be connected to at least one source of gas through a conduit and at least one outlet orifice configured to be connected to the at least one combustion chamber and the supply connector having a thermal conductivity substantially lower than a thermal conductivity of the body such that the supply connector assures that the temperature at the inlet orifice of the supply connector and the conduit is lower than the auto-ignition temperature of the given combustible or given combustibles,
the combustion device further comprising at least one gas source and one conduit connected to the inlet orifice of the supply connector and to the source of combustible,
the combustion device being arranged such that concentrated radiation illuminates one face of the body and a convertor for converting thermal energy into electricity on one face opposite to that illuminated by the concentrated solar radiation; and
a controller for controlling combustion in the combustion module as a function of the concentrated solar radiation.

20. The combustion module according to claim 2, in which the body is made of SiC and the supply connector and the evacuation connector are made of zirconium oxide.

21. The combustion module according to claim 1, in which the supply connector is made of a material with a thermal conductivity lower than a thermal conductivity of SiC.

22. The combustion module according to claim 21, in which the body is made of SiC.

\* \* \* \* \*